United States Patent [19]

Nieminen et al.

[11] Patent Number: 5,376,805
[45] Date of Patent: Dec. 27, 1994

[54] METHOD AND APPARATUS FOR DETERMINING THE SIZE AND POSITION OF A ROLL END HEAD

[75] Inventors: Seppo Nieminen, Järvenpää; Aimo Ohtonen, Kerava, both of Finland

[73] Assignee: Valmet Paper Machinery, Inc., Helsinki, Finland

[21] Appl. No.: 192,978

[22] Filed: Feb. 8, 1994

[30] Foreign Application Priority Data

Feb. 9, 1993 [FI] Finland ................. 930548

[51] Int. Cl.$^5$ ........................................... G01N 21/86
[52] U.S. Cl. ..................... 250/560; 356/387; 250/561
[58] Field of Search ............... 250/560; 356/386, 387; 901/47

[56] References Cited

U.S. PATENT DOCUMENTS

| | | | |
|---|---|---|---|
| 4,063,820 | 12/1977 | Borgese | 356/167 |
| 4,306,811 | 12/1981 | Judet | 356/372 |
| 4,978,859 | 12/1990 | Ransheim | 250/560 |
| 5,007,739 | 4/1991 | Shimano et al. | 356/383 |
| 5,157,265 | 10/1992 | Uomala | 250/560 |

*Primary Examiner*—David C. Nelms
*Assistant Examiner*—Steven L. Nichols
*Attorney, Agent, or Firm*—Cohen, Pontani, Lieberman & Pavane

[57] ABSTRACT

The present invention relates to a method and assembly suited to determining the size and position of a head relative to a clamp when using an industrial multi-axis robot. The invention is based on moving the clamp by means of the robot advantageously past three sensor elements and providing the clamp with a target element suitable for aiding in the position detection of the reference point of the clamp at the instant the clamp moves past a first sensor element. The size and position of the head are determined on the basis of geometrical lines computed from the head edge intercept signals obtained by means of the sensor elements. The lengths of the geometrical lines are determined from the speed of the clamp and the time intervals of intersect instants counted by a control system counter card connected to said sensor elements.

13 Claims, 7 Drawing Sheets

METHOD AND APPARATUS FOR DETERMINING THE SIZE AND POSITION OF A ROLL END HEAD

BACKGROUND OF THE INVENTION

1. Field of the Invention

The present invention relates generally to article measurement techniques, and more particularly, to a method and apparatus for determining the size and position of a moving article such as a paper roll end head.

2. Description of the Prior Art

The finished product of the papermaking process is a continuously issued web approximately 6 meters wide. For shipment to customers and converters, the web is slit into a plurality of more manageable widths and wound into cylindrical reels or rolls of normally 1 to 2 meters in diameter. Shipment weights of such rolls may range from 1700 to 9200 pounds. To protect the finished rolls from damage during shipment and handling, they are typically wrapped with a heavy grade of paperboard having a thickness of 0.23 mm or greater.

The presently prevailing technique for such roll wrapping is to draw a strip of wrapping board from a supply reel of greater axial length than the roll to be protected. This web strip is wrapped tightly about the cylindrical surface of the protected roll. The axially overhanging portion is crimped radially inward toward the roll center and tightly creased against the circular roll end. To seal the roll end and hold the crimps down against the end faces, two circular header disks or "heads" of approximately the same diameter as the protected roll are used at each roll end-face. One head is inserted within the surface wrap overhang flush against the roll end-face. Adhesive, typically a hot-melt glue, is then applied to the outer face of this first or inner head. Next, the overhanging portion of the surface wrap is crimped and pleated into the inner head adhesive. Thereafter, a second header disk or "outer head" having adhesive applied to the inner face thereof is pressed against the outer face of the surface wrap pleats, thereby covering the crimped overlap of the wrapper and the inner head.

The inner head is usually relatively thick and thus capable of protecting the roll end against mechanical damage. The outer head, which serves to bind the wrapper at the roll ends and protect the roll from humidity, can be substantially thinner than the inner head. Frequently the coloring and printed pattern of the outer head are designed to give the roll a neat appearance.

Common to all prior art wrapping methods is the need for circular, usually die cut, heads of substantially the same diameter as the protected roll. If several different diameter sizes are prepared for shipment by the producing mill, it is necessary to make, or purchase and store, such respectively sized heads preparatory to use. Prior to wrapping, the width and diameter of the roll to be protected is measured, and heads of suitable diameter and width are selected from this group for placement on the roll ends.

The end heads can be placed on the roll ends in a variety of ways. Manual placement of the heads is the oldest method, and it is still suited for relatively small capacity wrapping lines or applications not requiring a substantial degree of automation. In accordance with the manual technique, the operator measures the roll to be protected as noted above and positions the appropriate inner heads manually at the roll ends. The operator then places the corresponding outer heads Onto heated press platens, which platens press the outer heads into adherence with the roll ends. The inner heads are kept against the roll ends by means of separate arms for the duration of the crimping of the wrapper overlaps against the roll ends. The adherence of the outer heads to the platens during the operation is achieved using vacuum. It will again be noted that in the manual technique, the station operator must verify that heads of a correct diameter are selected for the roll ends and that these are correctly positioned thereon.

Various types of automatic heading machines have also been utilized. A common feature of almost all such conventional automated heading devices is that, for each end of the roll, a separate heading machine with an associated head clamp is provided. Each head clamp transfers the head from the head pile or stack to a corresponding roll end.

In one conventional heading device, a rotatable arm is mounted on a vertical guide, the arm having at its distal end a rotatable vacuum clamp for grasping the heads. This type heading machine is typically employed in conjunction with different kinds of head storage shelves situated beside the heading machine. Using this machine, the heads are placed on the roll ends so that the support arm of the clamp is transferred along a vertical guide to the level of the shelf containing the correctly sized heads. Next, the support arm of the clamp and the heading machine itself are rotated until the clamp is aligned parallel with the shelf. Thereafter, the head is gripped and transferred from the shelf to the roll end by rotating both the support arm of the clamp and the heading machine and moving the heading machine along the guide. Such conventional machines do not include a measurement device for determining the size and position of the heads.

In another type of known automated heading machine, the heads are placed in piles on the factory floor and then transferred therefrom by means of an overhead gripping device, typically a carriage mounted manipulator. The gantry transfer carriage of this device is constructed above the stacks of heads and the heading manipulators are generally movable along a single, crosswise movable rail. Thus, a separate stack of heads of a predetermined size must be provided for each heading manipulator.

In U.S. Pat. No. 5,157,265, entitled METHOD FOR DETERMINATION OF THE SIZE AND LOCATION OF AN END HEAD AND THE LOCATION OF AN END HEAD STACK IN A ROLL WRAPPER, issued on Oct. 20, 1992 to Vilho Uomala and assigned to the assignee herein, there is disclosed a method which may be used in conjunction with an overhead gantry manipulator system of the type described above. The measurement technique disclosed in the aforementioned patent is based upon utilizing the known speed at which a clamped head is moved to compute the dimensions thereof. Specifically, as the clamp carrying the head is moved past two aligned pairs of photocells at a constant, known speed, changes in the photocell signals indicate the points in time at which the leading edge of the head meets the photocells and the trailing edge of the head leaves the photocells. As will be ascertained by reference to the aforementioned patent, the distance between such intersect points can be computed utilizing the known speed of the head and the temporal difference between the signal changes. Since the shape of the head is also known, its position and size can thus be determined. Further, since the pickup position of the clamp relative to the head stack is known, the actual position of the head stack can be computed from the head position in the clamp.

In addition to the known techniques discussed above, it would also be possible to manipulate the heads using a standard multiple axis robot. Such a robot, for example, could be integrated with the layout of a wrapping line in a manner permitting the robot to place a head on both ends of the roll. To obviate the need for two separate head transferring cycles, it would be particularly desirable to configure such a robot with a two sided clamp capable of a flipping movement by which both roll ends could be sequentially gripped for simultaneous transfer.

Disadvantageously, however, the technique disclosed in the aforementioned patent can not be adapted for use with a robotic manipulator configured in the manner described above. Specifically, the aligned pairs of photocells would be unable to discern which of the two heads carried by the two-side clamp was the one whose edge causes the signal change. As such, the above described method is clearly incompatible with a two-sided clamp. Moreover, it must be noted that the above described method performs a comparison of the measured head position to a clamp reference point, which reference point is continuously known on the basis of signals obtained from the position transducers of the head transfer system. Consequently, the system is incompatible with the use of an industrial robot, since the position data of the robot arm is difficult to update in real time during high speed movements. Because movement of the robot arm cannot be slowed sufficiently to permit updating of the arm position data needed for measurement, the location of the clamp reference point in a robotic heading system must be performed without reliance upon arm position data.

The above described method has other disadvantages as well. Essentially, as the method is based upon the use of two photocell detectors only, it fails to detect defects of head edges. Thus, if a defective part of the head edge should be encountered by photocell, the head size and position will be rejected as being improperly sized although in fact it might have been acceptable. While rejection of a head poses no great problem, it does necessitate the retrieval of a new head and thereby causes a deviation from normal wrapping line operation.

It is therefore an object of the present invention to provide a method and apparatus for determining the head size and position relative to the clamp in a system utilizing a multiple axis industrial robot.

SUMMARY OF THE INVENTION

The present invention detects the position of a robotic clamp reference point by providing the clamp with a target element suitable for detection by a plurality of sensors. The head size and position are determined on the basis of geometrical lines computed from head edge intercept signals supplied by the sensors.

More specifically, a method for determining the size and position of a roll end head comprises gripping at least one head with a clamp having a predetermined reference point defined thereon and including a section which extends beyond an edge of the head. The clamp section defines a second point at a known distance relative to the predetermined reference point. The method further comprises moving the clamp past a plurality of sensors at a constant velocity and detecting from a first sensor an output signal change indicative of a measurement starting point for each sensor when the second point crosses the first sensor.

The method according to the present invention further includes detecting from each respective sensor an output signal indicative of a corresponding first intersect point when the head first crosses each sensor and measuring time elapsed between respective start and intersect points for each sensor. The method includes the additional step of computing the position and size of the head from the measurement start point of each sensor, the intersect points, and the known mutual distance between the second point defining the measurement start point and the predetermined reference point.

An apparatus constructed in accordance with the present invention comprises a clamp, having a predetermined reference point defined thereon, for gripping and conveying said end head at a constant velocity. The clamp includes a section which extends beyond an edge of a head to be conveyed and which defines a second point at a known distance relative to the predetermined reference point. A plurality of sensors are respectively arranged to sense an edge of the head as it is conveyed by the clamp relative thereto, and the clamp section is transferrable past a first of the sensors such that the first sensor provides an output signal change indicative of a measurement start point when the second point is aligned therewith. Additionally, the apparatus includes means responsive to the output signal and coupled to the sensors for computing a position of the edge relative to the second point.

A two sided head transferring clamp is preferred in order to avoid the need for more than one robot. This is because the use of a single-sided clamp would result in an excessively long heading cycle time and thus making investment in an expensive industrial robot economically unattractive.

The present invention makes it possible to determine the positions of both heads, each head being gripped at a respective side of the clamp. The position of each head is determined directly relative to the clamp reference point, thereby avoiding continual update of the clamp position data. Although two sensor elements may be utilized in accordance with the present invention, at least three are preferred in order to eliminate the effect of head edge defects on the measurement results. Moreover, the use of three detectors achieves a wider area of measurement, since the use of two detectors would require the detectors to be located at a close mutual distance so that the head edges of the smallest diameter heads to be encountered intersect the photocell beams.

An additional benefit of the present invention includes improved accuracy in the centering of the heads onto the press platens, since the heads can be directly centered according to the roll diameter. In prior art systems, heads of a certain diameter could be centered accurately for one roll diameter only, and this centering adjustment was then used for a certain range of roll diameters. Consequently, at other diameters within the range, the head has heretofore been slightly displaced from the center point of the roll end.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

BRIEF DESCRIPTION OF THE DRAWINGS

A better understanding of the present invention will be facilitated by reference to the detailed description below in combination with the annexed drawings in which.

DETAILED DESCRIPTION OF THE PREFERRED EMBODIMENTS

When a multi-axis industrial robot is employed for head placement, the heads are retrieved from stacks located within the reach area of the robot in accordance with program control and roll data related to the roll being wrapped. Using a two-sided clamp the robot picks up heads matching the roll data and transfers them to the ends of the roll or onto press platens. The present invention is particularly adapted for use in conjunction with outer heads, so according to the illustrating embodiments described below, the heads are transferred onto press platens 7.

Figure 1:
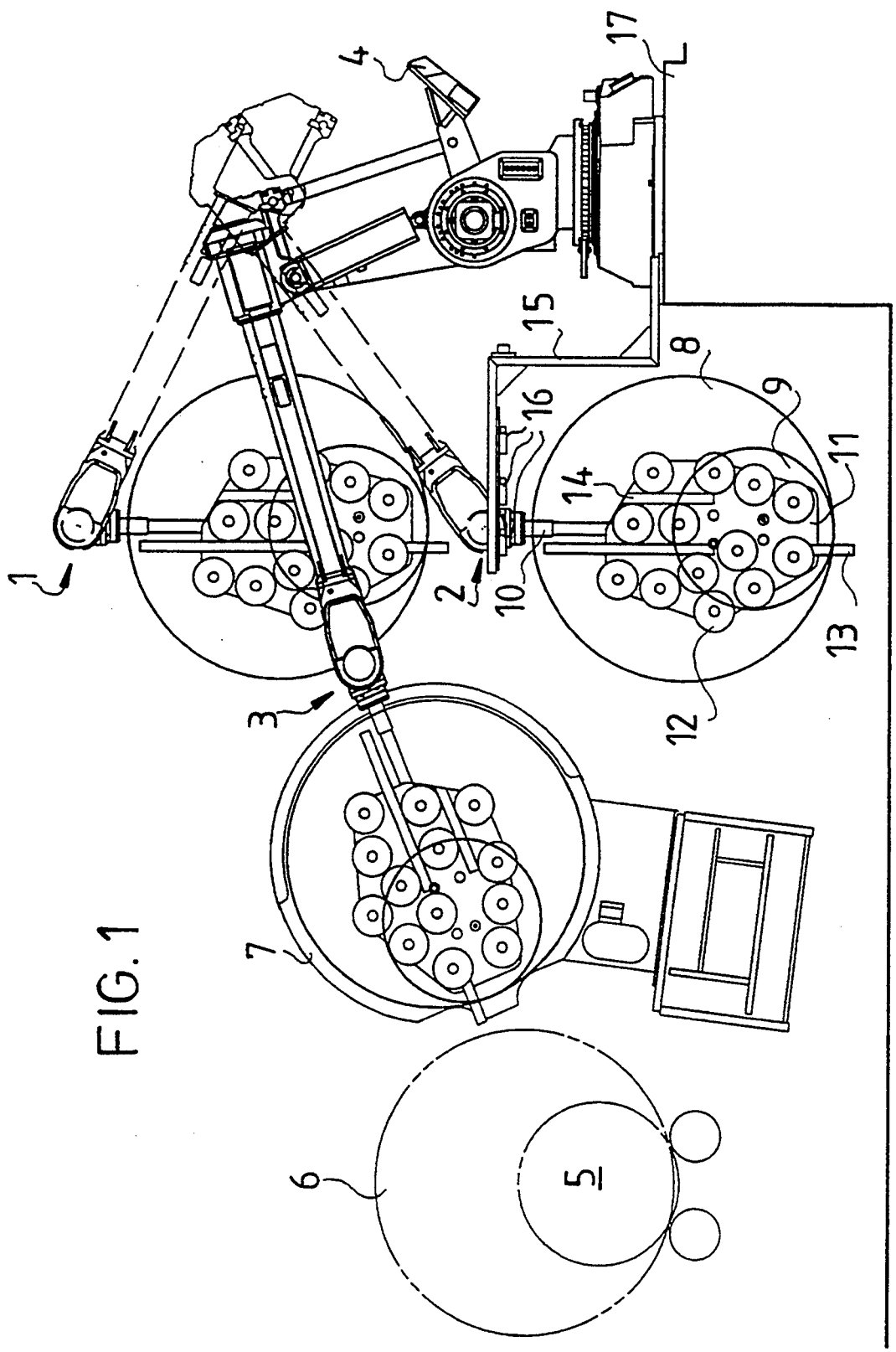
FIG. 1 shows an overall side view of a head-manipulating robot and press platen arranged in accordance with the present invention.

With reference to FIG. 1, the head-manipulating robot 4 is shown in three different positions. Heads 8, 9 adhered to a clamp 11 by vacuum heads 12 of the robot 4 are shown in outline form to elucidate the construction of the clamp 11. In position 1, the robot has engaged a respective head 8, 9, at a corresponding side of the clamp 11 and is ready to perform a measurement movement. The measurement movement is performed by transferring the clamp 11 past photocell sensor 16 of sensor assembly 15. After the robot 4 has performed the measurement movement, the robot is in position 2, wherefrom it moves further to position 3 and delivers a head onto a press platen 7. The press platens 7 are situated at both ends of the roll 5, 6 to be wrapped, and the robot 4 delivers a head onto each platen, sequentially. The head is adhered by a vacuum onto the press platen and the platen is heated, whereby a glue layer on the adhesive side of the head melts and permits the head to be glued on the roll end by pressing the press platens 7, which are turned adjacent to the roll ends, against the roll ends.

Figure 2:
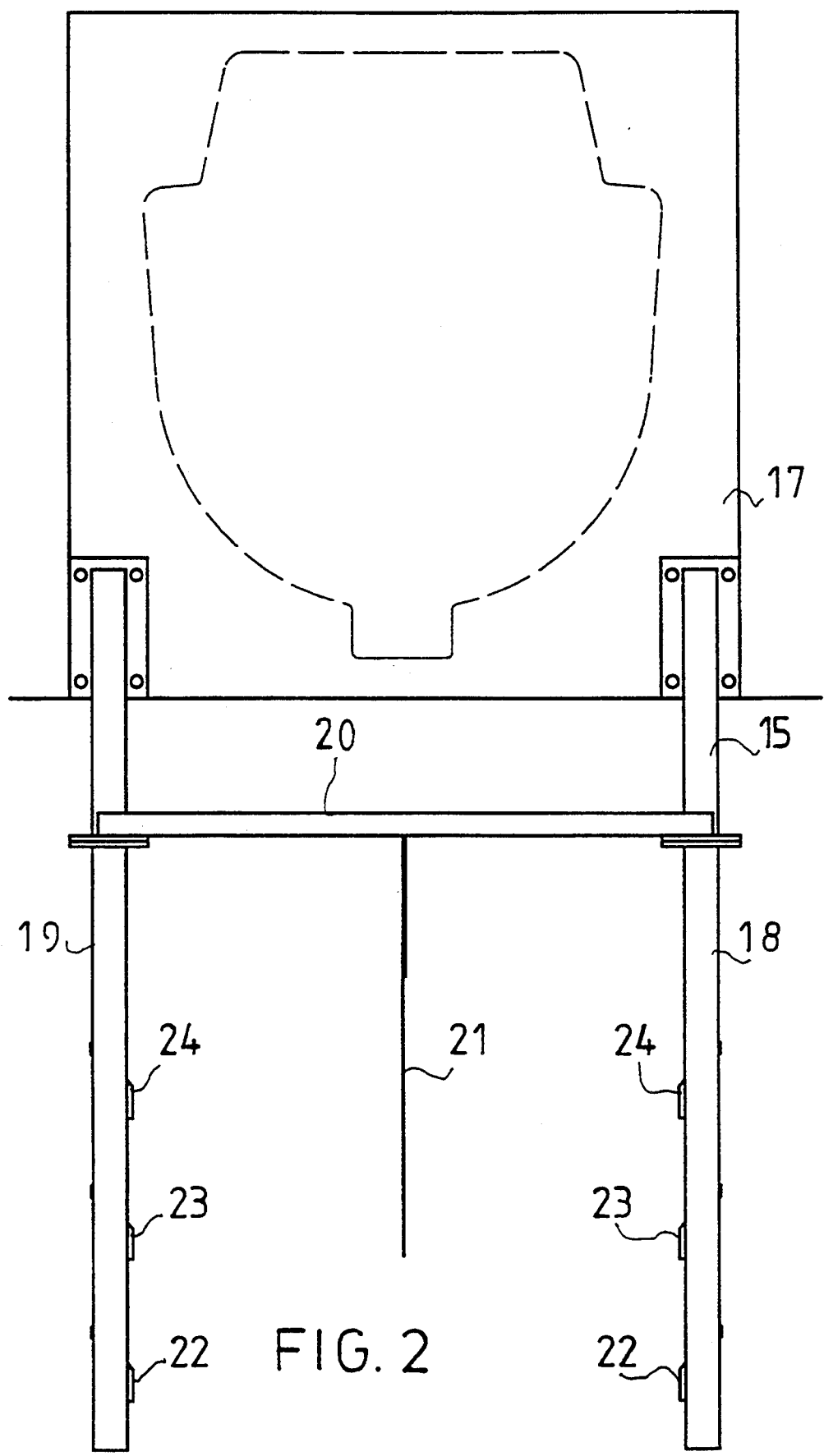
FIG. 2 depicts a top view of the arrangement of measurement sensors in accordance with the present invention.

With reference to FIGS. 3–6, the movement of the clamp 11 from position 1 to is position 2 is shown. In the illustrative example depicted and described herein, the term "head" refers to the smaller head 9 indicated by solid lines in the diagrams. The circles drawn in dashed lines refer to the largest-diameter head 8 that can be accommodated by the apparatus. During the movement, the clamp 11 passes between parallel supporting members 18 and 19 of the sensor assembly 15 shown in FIG. 2. The sensor assembly 15 is mounted on a pedestal 17 of the robot and supporting members 18 and 19 are interconnected by a horizontal bar 20, thereby defining a fork-like arrangement. To the center of the horizontal bar 20 is mounted a fixed reflector 21, aligned parallel with members 18 and 19. Each of members 18 and 19 is provided with three inwardly facing photocell sensors 22–24.

Figure 3:
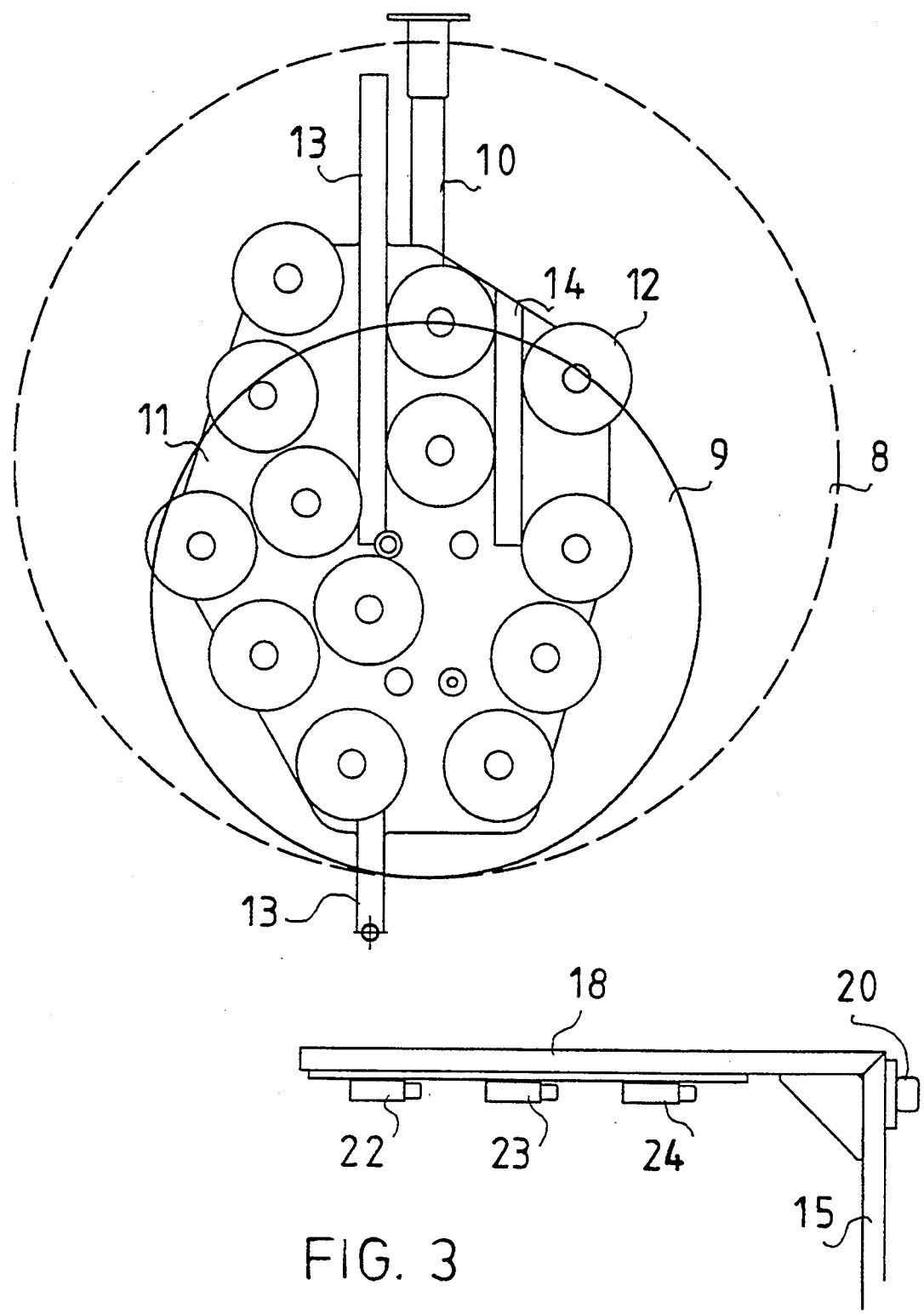
FIGS. 3–6 illustrate the measurement sequence during movement of the clamp past the sensor arrangement of FIG. 2.
Figure 4:
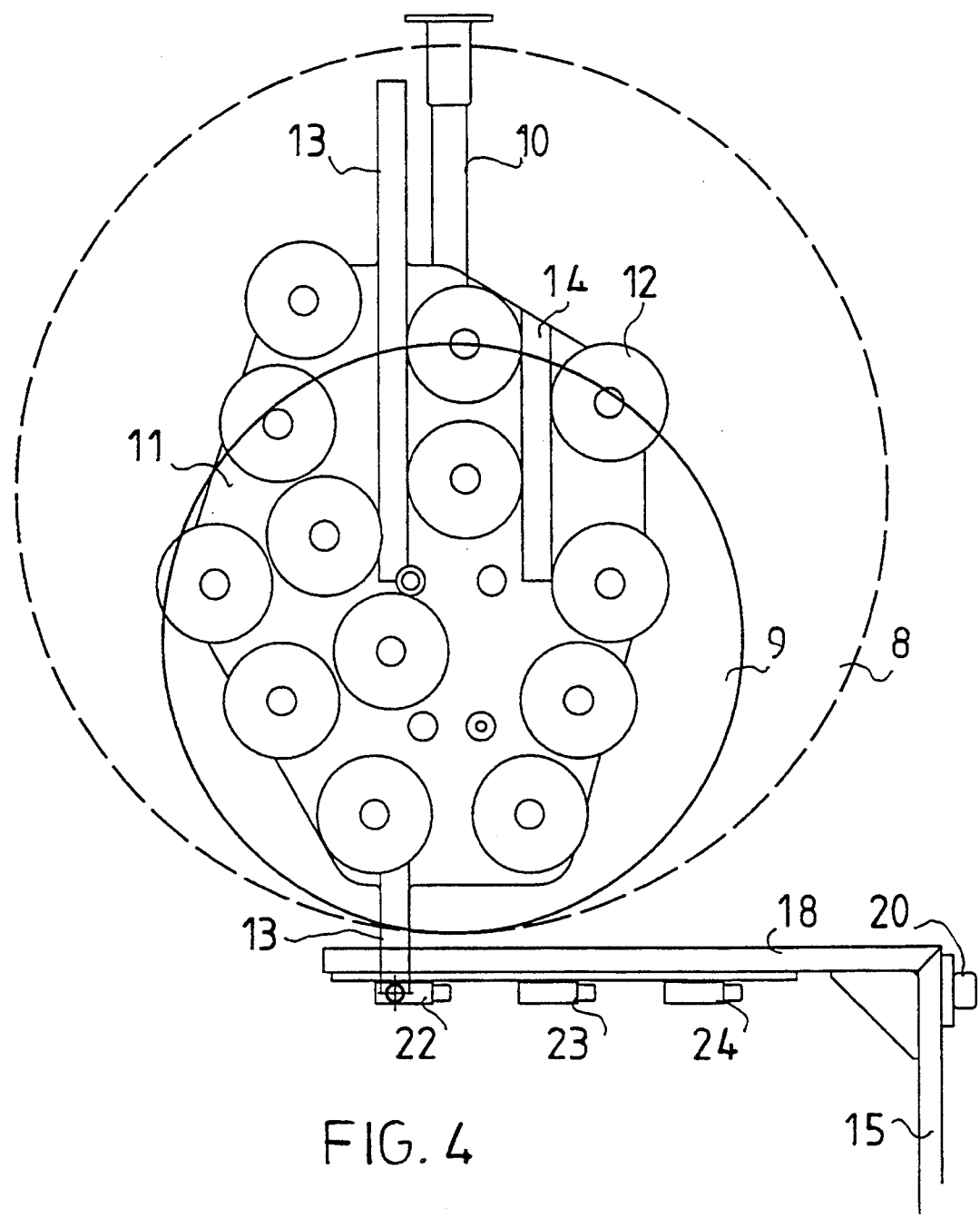

When the clamp 11 travels past the forks 18, 19 of the sensor assembly 15, the fixed reflector 21 is disposed between the halves of the clamp 11. The clamp 11 is provided with a vertically aligned reflector 13, coincident with the first photocell 22. Correspondingly, the clamp 11 is also provided with another vertically aligned reflector 14 on the side facing the fork 10 of the clamp 11, coincident with the second photocell. With reference to FIG. 3, the clamp 11 with the adhered heads is shown approaching the measurement area, and with reference to FIG. 4, the start instant of the measurement is shown. At the start instant of the measurement, the leading end of the first vertical reflector 13 intersects the beam of the first photocell 22. The end of the first reflector 22 is overextended so far past the edge of the base plate of the clamp 11 that not even the largest possible head 8 can entirely conceal the reflector 13, even if the head should happen to be adhered to an incorrect position of clamp 11. The first reflector 22 must always overextend sufficiently past the head to obtain a start signal for the measurement operation. Such a start signal is obtained when the first reflector 13 intersects the beam of the first photocell sensor 22 and the start signal is used to initiate the measurement. Photocell sensors 22–24 are connected to a control system counter card (not shown) which, on the basis of a computer clock (not shown), computes time intervals elapsed from first signal transition indicating the start of the measurement. The start instant is the same for all photocell sensors 22–24, and at the start instant, the beam of the first photocell sensor 22 hits the first vertical reflector 13, while the beams of the second photocell 23 and the third photocell 24 hit the horizontally aligned, fixed reflector 21. The transfer speed of the clamp 11 moved by robot arms is very precisely controlled to remain constant and the robot is programmed to follow an exactly defined path. As such, the distances between the signal change points can be easily computed on the basis of the time counted by the counter card and the constant clamp speed employed. As information on the instantaneous speed of the clamp 11 is unknown or difficult to compute when the speed is accelerated or decelerated, the clamp 11 should be moved at a constant speed during the measurement. The clamp speed and the time required for the movement can be empirically verified by performing tests prior to the actual use of the assembly. The empirical data so obtained can be used to determine the optimum speed of clamp movement.

Figure 5:
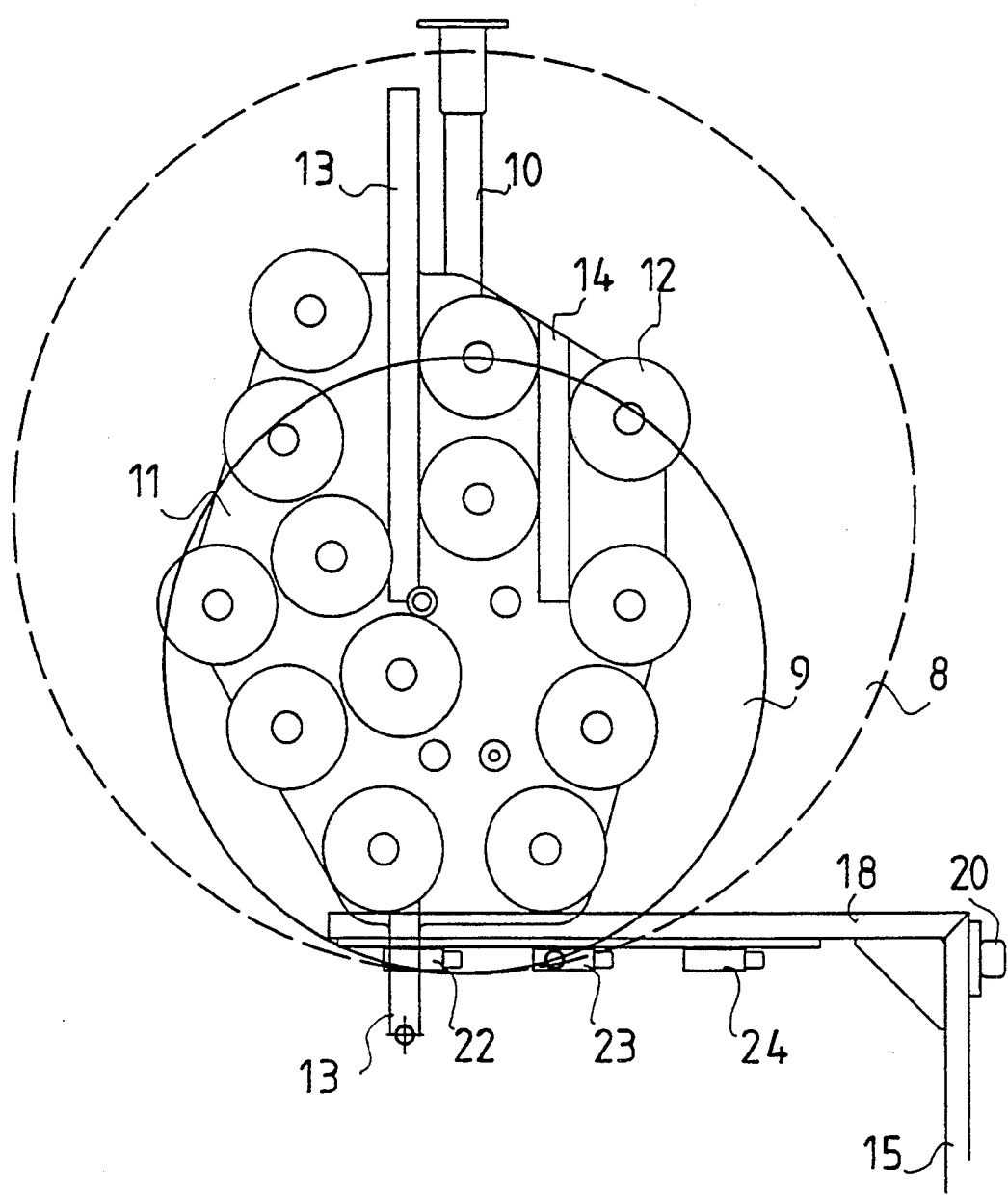
Figure 6:
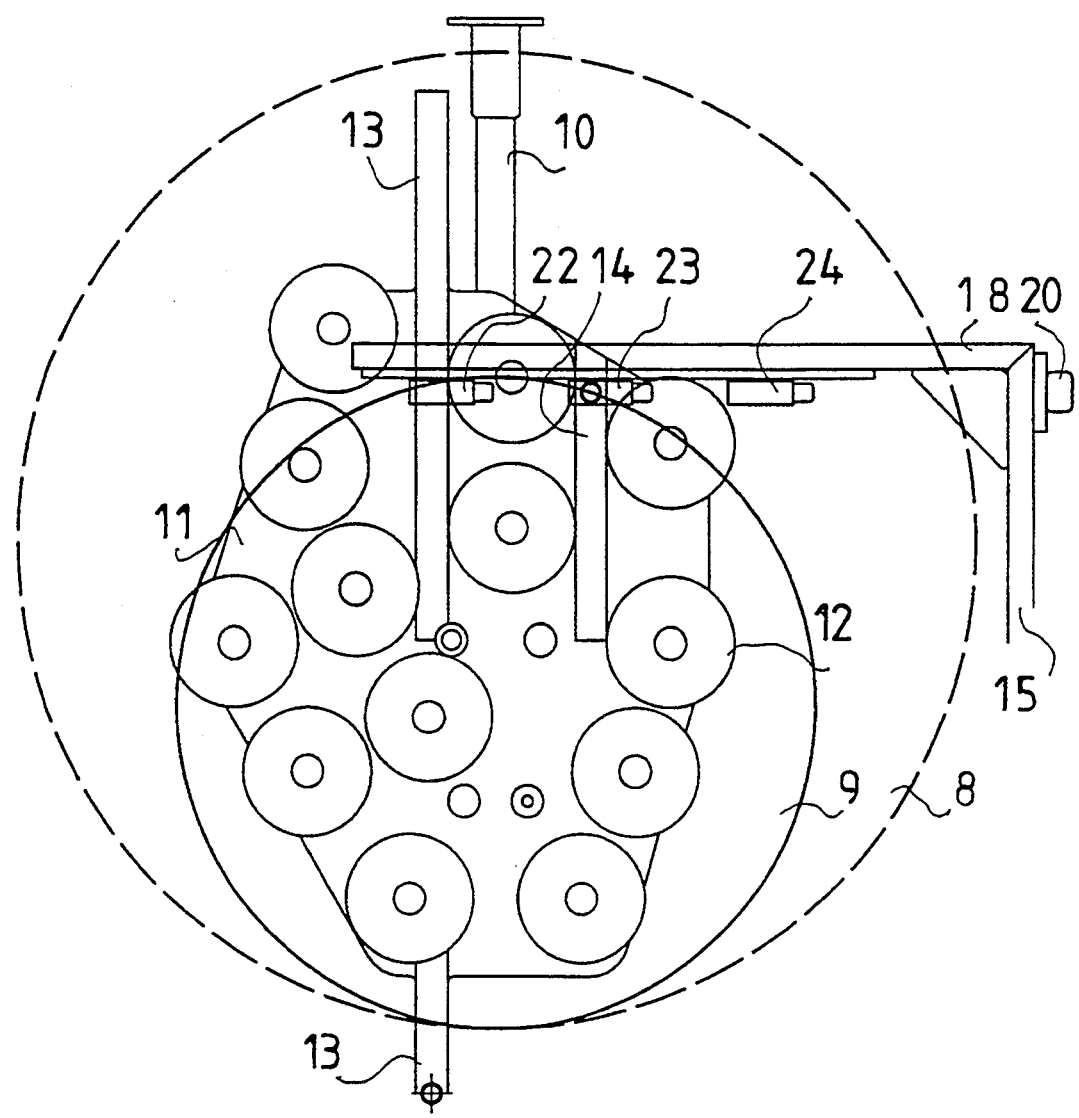

During the next measurement phase, the head 9 adhered to the clamp 11 intersects the beam of one of the photocell sensors. With reference to FIG. 5, the head 9 is shown intersecting the beam of the first photocell sensor 22 and is just about to intersect the beam of the second photocell sensor 23. At the intersect point, the output signal of the photocell undergoes a change, and on the basis of the time elapsed between the start instant signal of the measurement and the signal change point, the distance between the level of the end of the first reflector 13 and the head edge can be computed. The next change in the output signals of the photocell sensors 22–24 takes place when the head 9 has passed the beams of the photocell sensors, whereby a second output signal transition is detected and the second distance can be computed. When the head 9 passes the beam of the first photocell sensor 22, the beam can again hit the first reflector 13, and correspondingly, the beam of the second photocell sensor 23 can hit the second reflector 14, or alternatively, if the head 9 adhered to the clamp 11 is so large as to entirely conceal the second reflector 14, the beam of the second photocell sensor 24 can hit the horizontally aligned, fixed reflector 21. The third photocell sensor 24 is preferably positioned so as not to aim its beam against the clamp 11, so that its beam again hits the horizontally aligned reflector 21 when the head 9 has passed the beam.

Figure 7:
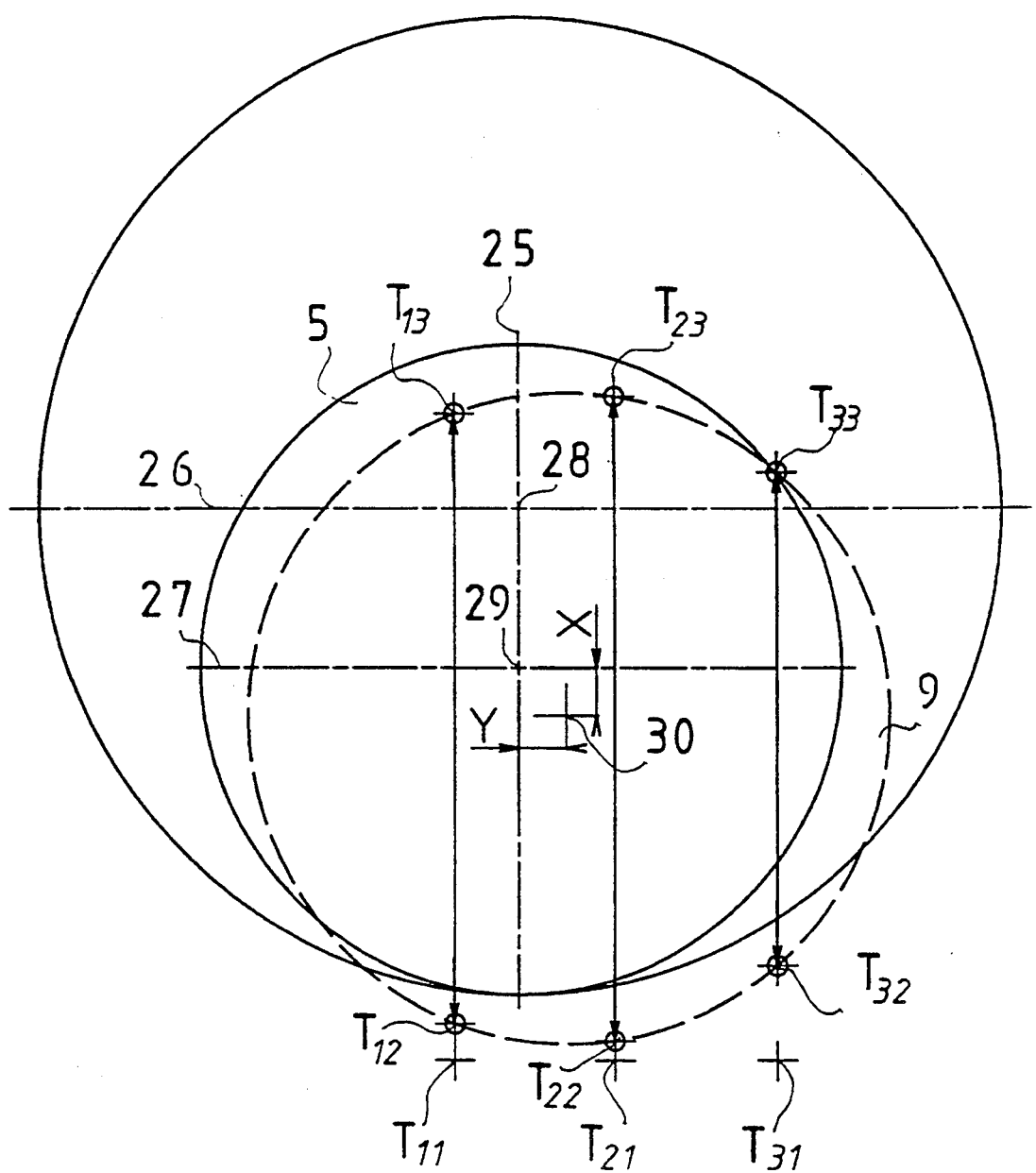
FIG. 7 is a diagrammatic representation of the measurement principle utilized by the present invention.

With reference to FIG. 7, the method of computing the size and position of the head adhered to the clamp 11 on the basis of the signals from the photocell sensors 22-24 will now be described in detail. The largest circle in FIG. 7 is called a reference circle 8, whose center point 28 is concentric with the reference point of the clamp 11, that is, the point against which the clamp movements are defined and verified. The diameter of the reference circle can be selected as desired, for purpose of example the reference circle 8 selected herein has a diameter corresponding to that of the largest diameter head to be picked up. The center point 28 of the reference circle is at the intersect point of lines 25 and 26. The smaller circle 5 drawn by the solid line indicates the correct position for a head picked up by the clamp 11, said position also corresponding to correct head placement on the end 5 of the roll being wrapped. The actual position of the picked up head is shown as circle 9 drawn in dashed line that in this diagram has a diameter identical to that of the smallest head 9 in the preceding diagrams.

For each roll diameter, the correct position of the center point 29 is determined as the intersect point of a vertical line 25 passing through the center point of the reference circle 8 and a horizontal line 27 passing through the center point of the circle 5, circle 5 indicating the correct position of the head. Thus, this point defines the correct position of the head relative to the reference point 28 of the clamp.

When first reflector 13 intersects the beam of the first photocell 22, a counting of the time intervals is commenced for all photocell sensors 22-24. During this measurement phase, the sensors provide measurement start point signals $T_{11}$, $T_{21}$, $T_{31}$, respectively. Since the position of the end of the first reflector 13 relative to the clamp reference point 28 is known, the position of the clamp 11 is now determined unambiguously. As the head 9 intersects the beams of the photocell sensors 22-24, a first set of intersect points $T_{12}$, $T_{22}$, $T_{32}$ is obtained. With the help of the elapsed time intervals and known speed of the clamp, the points corresponding to the intersect points $T_{12}$, $T_{22}$, $T_{32}$ can now be computed relative to the point corresponding to the measurement start point. As movement of the clamp continues, a second set of intersect points $T_{13}$, $T_{23}$, $T_{33}$ is obtained. The points corresponding to these intersect instants can subsequently be computed. Finally, the diameter and position of the head 9 is determined by computing the coordinates of a circle passing via the points corresponding to instants $T_{12}$, $T_{22}$, $T_{32}$ and $T_{13}$, $T_{23}$, $T_{33}$, whereby the head diameter and position of its center point 30 are obtained. In other words, the circle corresponding to the measured points is determined on the basis of the known distances of the photocell sensors and intersect lines formed by the passing head. If a single point fails to match the circle, that is, has erroneous coordinates due to, e.g., a head edge defect, such a point can be omitted, because a reduced number of measurement points are already sufficient to determine the circle. Accordingly, it is not necessary to retrieve a new head as is the case with automated heating machines of the prior art. If the center point of the head 9 picked by the clamp is displaced from the correct clamping center point 29, a correction of the center point coordinates is required and must be computed. The correction is simply obtained as the distances X, Y of the measured center point from a horizontal line 27 passing via the correct center point 29 and from a vertical line 25 passing via the same center point, respectively. As the actual position of the center point of the head 9 is known, the head 9 can be transferred by means of the robot onto the press platen so as to aim the center point 30 of the head to accurately at the center of the roll end. The position alignment of the head on the other side of the clamp occurs simultaneously in an identical manner to that described above.

Besides the illustrated embodiment, a variety of modifications and alternative embodiments are possible. In the above-described embodiment, for example, the sensor instrumentation was implemented using three photocell sensors. In principle, two sensors are sufficient for determining the head size and position, although such an embodiment compromises the reliability of the measurement. Similarly, the head size and position could be directly determined from a single set of intersect points, i.e. either the first set of three intersect points $T_{12}$, $T_{22}$, $T_{32}$, or the second set of three intersect points $T_{13}$, $T_{23}$, $T_{33}$. Besides photocell sensors, other types of sensors are also feasible and their placement can be varied in a desired manner. However, the mounting of the sensors on a single straight bar is an extremely simple way of implementing the assembly. The direction of clamp movement is insignificant to the spirit of the invention provided that the sensor positions are appropriately selected relative to the clamp movement and said movement is linear within the detection zone of the measurement.

Instead of separate reflectors, the entire clamp can be made reflective or treated with a reflective material so as to give the sensors a signal different from that obtained from the head material. The fixed, horizontal reflector can be implemented in multiple ways and its structure is naturally related to the placement of the sensors. Obviously, sensors operating without reflectors are also feasible.

In view of the foregoing, it will be readily appreciated that those skilled in the art will recognize changes and modification, which can be made to the present invention without departure from its spirit or scope. It is therefore intended that the scope of the present invention be limited only by the appended claims.

What is claimed is:

1. A method for determining the size and position of a roll end head comprising:

gripping at least one head with a clamp having a predetermined reference point defined thereon and including a section which extends beyond an edge of the head, said clamp section defining a second point at a known distance relative to said predetermined reference point;

moving said clamp past a plurality of sensors at a constant velocity;

detecting from a first sensor an output signal change indicative of a measurement starting point for each sensor when said second point crosses said first sensor;

detecting from each respective sensor an output signal indicative of a corresponding first intersect point when said head first crosses each sensor;

measuring time elapsed between respective start and intersect points for each sensor; and computing the position and size of the head from the measurement start point of each sensor, the intersect points, and the known mutual distance between said second point defining the measurement start point and the predetermined reference point.

2. A method as defined in claim 1, wherein said moving step comprises moving the head past three sensors.

3. A method as defined in claim 1, further including a step of detecting a second output signal change from each respective sensor indicative of a corresponding second intersect point when said head passed each sensor, wherein the size and position of the head are determined from detected start points, first intersect points measured from a leading edge of the head, and second intersect points measured from a trailing edge of the head.

4. A method as defined in claim 1, wherein the first intersect points correspond to a leading edge of the head, the size and position of the head being determined from the start point of each sensor and said first intersect points.

5. A method as defined in claim 1, wherein the first intersect points correspond to a trailing edge of the head, the size and position of the head being determined from the start point of each sensor and said first intersect points.

6. A method as defined in claim 1, further comprising selecting for each head diameter an ideal position on the clamp, determining the actual position of a head thereon relative to an ideal position corresponding thereto, and compensating for the difference therebetween when placing the head on a roll being wrapped.

7. A method as defined in claim 1, wherein first and second heads are moved concurrently by said clamp between facing pairs of sensors and wherein the position and size of both heads are determined during the computing step.

8. An apparatus for determining the size and position of a roll end head, comprising:

a clamp, having a predetermined reference point defined thereon, for gripping and conveying said end head at a constant velocity, said clamp including a section which extends beyond an edge of a head to be conveyed and which defines a second point at a known distance relative to said predetermined reference point;

a plurality of sensors respectively arranged to sense an edge of the head as said head is conveyed by said clamp relative thereto, said section being transferrable past a first of said sensors and said first sensor being adapted to provide an output signal change indicative of a measurement start point when said second point is aligned therewith;

and means responsive to said output signal change and coupled to said sensors for computing a position of said edge relative to said second point.

9. An apparatus as defined in claim 8, wherein said plurality of sensors includes three sensors.

10. An apparatus according to claim 9, further including a reflector dimensioned arranged and arranged to reflect beams of said second and third sensors, said clamp being movable between said reflector and said sensors.

11. An apparatus as defined in claim 8, wherein said clamp has first and second gripping surfaces for gripping corresponding first and second heads concurrently and wherein said plurality of sensor elements are arranged in inwardly facing groups to permit said clamp to be advanced therebetween.

12. An apparatus according to claim 8, wherein said sensors are photocells.

13. An apparatus according to claim 12, wherein said clamp is movable in a first linear direction and wherein said clamp section is a reflector aligned in a direction parallel to said first linear direction, said second point being located at a distal end of said reflector and said output signal being initiated when a light beam is reflected at said second point.

* * * * *